Figure 4:
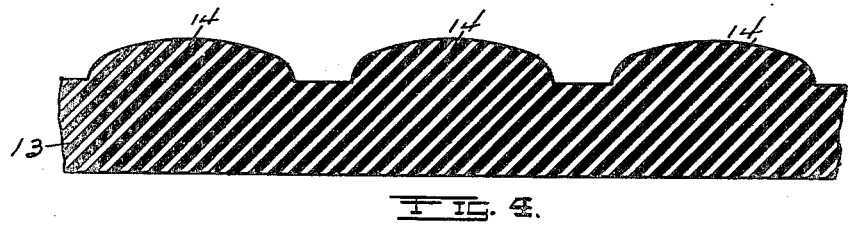

Aug. 19, 1924.
C. W. WOLFE
RUT GUARD
1,505,233
Filed Oct. 12, 1922    3 Sheets-Sheet 1
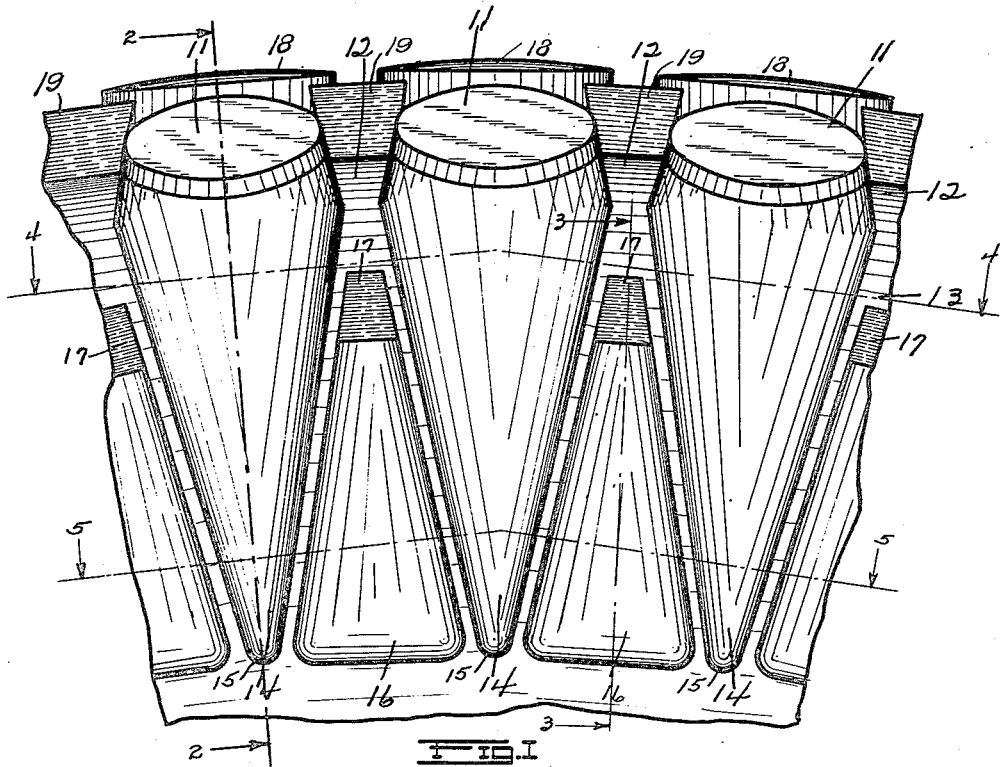
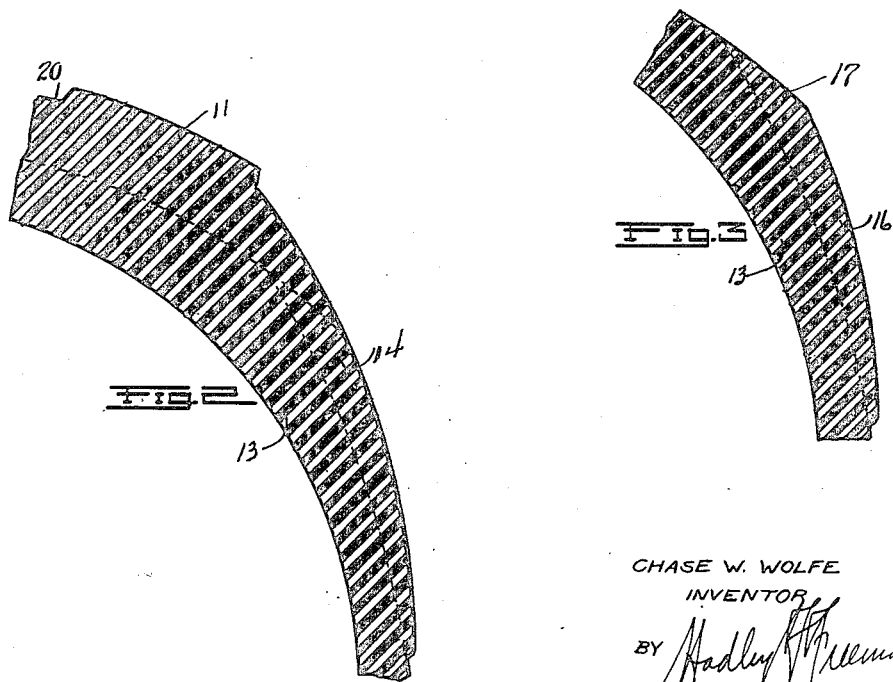
CHASE W. WOLFE
INVENTOR
BY
ATTORNEY Aug. 19, 1924.

C. W. WOLFE

RUT GUARD

Filed Oct. 12, 1922

1,505,233

3 Sheets-Sheet 2

CHASE W. WOLFE
INVENTOR
BY
ATTORNEY

Aug. 19, 1924.
C. W. WOLFE
RUT GUARD
Filed Oct. 12, 1922
1,505,233
3 Sheets-Sheet 3
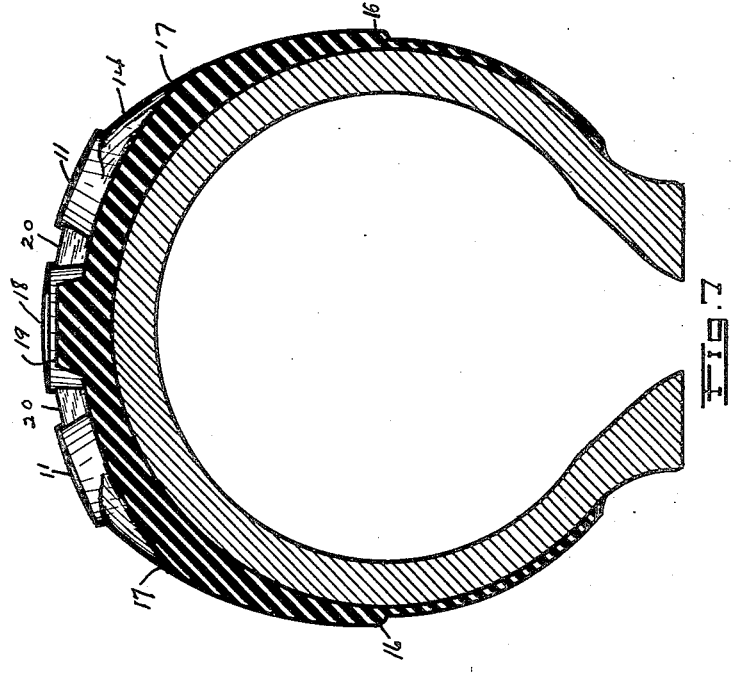
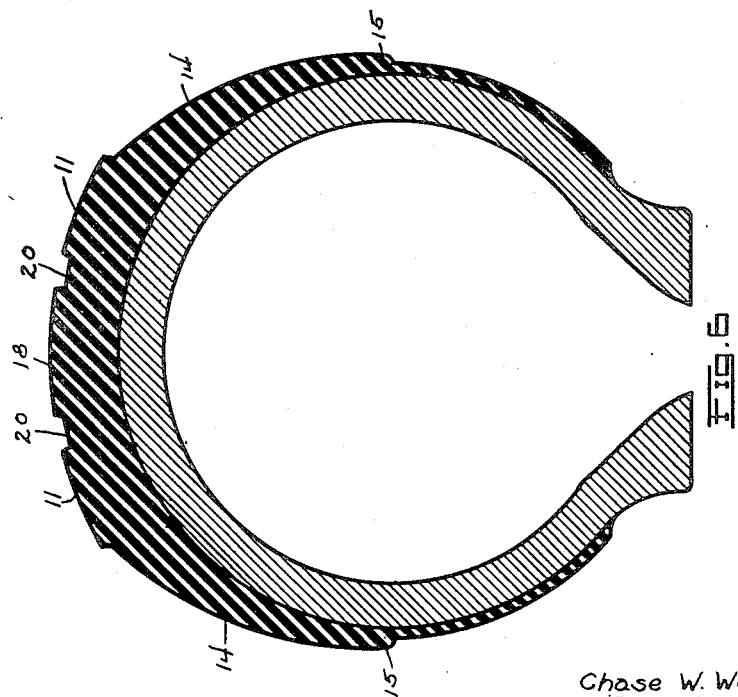
Chase W. Wolfe.
Inventor.
By Robert D. Harry
Attorney.

Patented Aug. 19, 1924.

1,505,233

UNITED STATES PATENT OFFICE.

CHASE W. WOLFE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

RUT GUARD.

Application filed October 12, 1922. Serial No. 594,219.

*To all whom it may concern:*

Be it known that I, CHASE W. WOLFE, a citizen of the United States, and a resident of Milwaukee, in the county of Milwaukee and State of Wisconsin, have invented certain new and useful Improvements in Rut Guards, of which the following is a specification.

Figure 5:
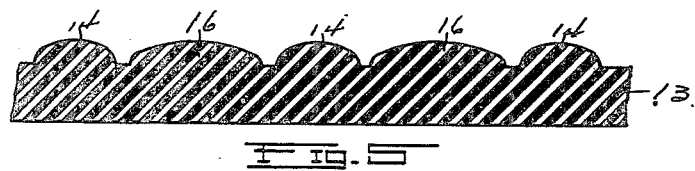

Automobile tires, particularly large pneumatic truck tires, often fail prematurely because of abrasion of the side walls by rut-wear. Various expedients have been suggested to overcome this premature failure but so far as I am aware none of them have been thoroughly satisfactory in operation. My invention provides means for satisfactorily protecting a tire against this wear. In the drawings accompanying this specification and forming a part thereof I have shown, for purposes of illustration, one form which my invention may assume. In these drawings:

Figure 1 is a side view of a fragment of tire embodying this illustrative form of my invention, while Figures 2, 3, 4, and 5 are sections on the lines 2—2, 3—3, 4—4, and 5—5 respectively.

Fig. 6 is a complete section on line 2—2 of Fig. 1. Fig. 7 is a complete section on line 3—3 of Fig. 1.

In the drawings I have shown a tire having a tread provided with a row of buttons 11 on each side of the tread separated by recesses 12 and I have shown these buttons as continued down onto the side wall 13 in the form of lugs 14 which taper until they terminate in rounded points 15 disposed substantially midway of the side wall of the tire. A row of buttons 18 connected to each other at 19 and to buttons 11 at 20 are disposed centrally of the tread. Interspersed between the lugs 14 are co-operating lugs 16 starting substantially at the line of termination of the lugs 14 and tapering upward until they finally terminate in beveled ends 17 disposed slightly below the tread line of the tire. With this construction I thoroughly protect the tire against premature failure from rut-wear and at the same time add no material which will act to cause separation in the tire.

I am aware that certain modifications may be made without departing from my invention and this disclosure is illustrative only and my invention is not limited thereto.

I claim:

1. A tire provided on each side with a plurality of projections extending radially inwardly from the tread portion thereof and with a plurality of interpositioned projections extending radially outward from a zone on the tire radially inwardly from the tread thereof.

2. A tire provided with projections extending from the tread to a zone substantially midway of the side of the tire and projections on the side of the tire, lying wholly below the line of said tread, cooperating with said first mentioned projections.

3. A pneumatic tire provided with a substantially flat tread having projections extending below the normal tread line of the tire and projections on the side walls of the tire cooperating with said first projections to form therewith a wearing surface extending substantially from the widest point on one side of the tire cross section to the widest point on the other.

4. A pneumatic tire comprising a substantially flat tread having conical shaped projections extending below the normal tread line of the tire and wedge shaped projections positioned between said conical projections, said tread and projections forming a wearing surface extending substantially from the widest point on one side of the tire cross section to the widest point on the other side.

In testimony whereof I have signed my name to the above specification.

CHASE W. WOLFE.